United States Patent [19]
Roberts et al.

[11] Patent Number: 5,006,250
[45] Date of Patent: Apr. 9, 1991

[54] PULSING OF ELECTRON DONOR AND ELECTRON ACCEPTOR FOR ENHANCED BIOTRANSFORMATION OF CHEMICALS

[75] Inventors: Paul V. Roberts, Cupertino; Gary D. Hopkins, Sunnyvale; Lewis Semprini, Palo Alto; Perry L. McCarty, Stanford; Douglas M. MacKay, Venice, all of Calif.

[73] Assignee: The Board of Trustees of the Leland Stanford Junior University, Stanford, Calif.

[21] Appl. No.: 128,664

[22] Filed: Dec. 4, 1987

[51] Int. Cl.⁵ .............................................. C02F 3/34
[52] U.S. Cl. .................................. 210/610; 210/631; 210/747; 210/908
[58] Field of Search ............... 210/610, 611, 631, 747, 210/908, 614

[56] References Cited

U.S. PATENT DOCUMENTS

| | | | |
|---|---|---|---|
| 4,401,569 | 8/1983 | Jhaveri et al. | 210/747 X |
| 4,588,506 | 5/1986 | Raymond et al. | 210/747 X |
| 4,591,443 | 5/1986 | Brown et al. | 210/747 |
| 4,683,064 | 7/1987 | Hallberg et al. | 210/747 X |
| 4,749,491 | 6/1988 | Lawes et al. | 210/747 X |

Primary Examiner—Tom Wyse
Attorney, Agent, or Firm—Flehr, Hohbach, Test, Albritton & Herbert

[57] ABSTRACT

The present invention is directed to a method for purifying an underground water supply containing halogenated aliphatic compounds by in-situ biodegradation of said compounds, comprising injecting water into an aquifer zone, the injected water containing an electron donor capable of being utilized by an indigenous population of microorganisms contained in the groundwater supply as a primary growth substrate, and an electron acceptor for oxidation of the primary substrate, by separate addition of electron donor and electron acceptor temporally or spatially to stimulate growth of the microorganisms and to distribute them throughout the aquifer zone to cause in-situ degradation of the halogenated aliphatic compounds by metabolic activity of the microorganisms.

29 Claims, 5 Drawing Sheets

PULSING OF ELECTRON DONOR AND ELECTRON ACCEPTOR FOR ENHANCED BIOTRANSFORMATION OF CHEMICALS

The present invention is directed to an improved method for the biological transformation of chemicals, particularly those that are contaminants in soils and in the subsurface environment, including groundwater, and an apparatus to carry out this method. More specifically, the present invention is directed to a method for purifying an underground water supply containing halogenated aliphatic compounds by in-situ biodegradation of those compounds using an indigenous population of microorganisms contained in the water supply.

BACKGROUND OF THE INVENTION

Contamination of groundwater by halogenated aliphatic contaminants, commonly known as chlorinated solvents is a frequent problem. In a survey of 945 water supplies, a group of researchers found trichloroethylene (TCE), tetrachloroethylene cis- and/or trans-1,2-dichloroethylene and 1,1-dichloroethylene to be the most frequently appearing compounds other than trihalomethanes. Westrick, J. J., et al., "The Ground Water Supply Survey", J. Amer. Water Works Assoc., 76(5):52–59 (1984).

Restoration of aquifers contaminated by these compounds have previously been based on the extraction of contaminated groundwater by pumping and subsequently treating the water at the surface. This method has proven to be effective but often entails great expense and also a risk of transferring the contaminants to another medium, such as the atmosphere. To circumvent these difficulties, in-situ treatment of contaminants has become a favorable alternative.

Various methods of in-situ restoration of chemically contaminated aquifers have been employed. For example, U.S. Pat. No. 3,846,290 discloses a process for the in-situ reclamation of aquifers contaminated by liquid fuels, such as hydrocarbons. The patent discloses a process of degrading hydrocarbon contaminants by first promoting proper growth conditions for a native population of microorganisms in the subsurface by simultaneous addition of oxygen and nutrients. The microorganisms then use the hydrocarbon contaminants as primary substrates for growth and are able to degrade those contaminants.

Biotransformation of halogenated aliphatic compounds in water has been demonstrated in laboratory studies using soil columns and mixed cultures. For example, Wilson, J. T. and Wilson, B. H. in "Biotransformation of Trichloroethylene in Soil", *Applied and Environmental Microbiology*, 29:242–243 (1985), disclose a laboratory transformation using microorganisms in an unsaturated soil column with an atmosphere of 0.6% natural gas and air. Fogel, M. M., et al. "Biodegradation of Chlorinated Ethenes by a Methane-Utilizing Mixed Culture", *Applied and Environmental Microbiology*, 51:720–724 (1986), discloses the biodegration of TCE, vinyl chloride, vinylidene chloride and cis- and trans-1,2-dichloroethylene by using mixed cultures of methaneoxidizing bacteria in the laboratory.

Henson, J. M. et al., "Metabolism of Chlorinated Aliphatic Hydrocarbons by a Mixed Bacteria Culture Growing on Methane", Abstract Q-97, Annual Meeting American Society of Microbiology, Atlanta, GA, p. 298 (1987) discloses the biodegradation of a range of both single and double carbon compounds by using mixed bacterial cultures in the laboratory.

U.S. patent application, Ser. No. 770,445, inventors Wilson, Jr., J. T. and Wilson, B. H., filed Aug. 29, 1985, discloses a method of transforming halogenated aliphatic hydrocarbons by treating contaminated water with microorganisms that metabolize gaseous lower molecular weight alkanes in the presence of oxygen.

In-situ biorestoration of aquifers contaminated by halogenated aliphatic compounds requires a different approach than that used to restore hydrocarbon-contaminated aquifers. Hydrocarbon contaminants can be used by microorganisms as primary growth substrates. However, in most cases halogenated aliphatic compounds cannot be used by microorganisms as primary growth substrates. The in-situ degradation of these compounds can be promoted by the biostimulation of a class of native microorganisms by introducing an appropriate primary substrate for growth (an electron donor) and an electron acceptor into the aquifer zone. This provides the microorganism with sufficient energy for growth to increase its population and maintain it at a level sufficient to bring about a significant rate of transformation. The microorganisms can then degrade the halogenated aliphatic compounds as secondary substrates.

TCE, a common groundwater contaminant, has been the focus of many efforts to use biotransformation to cleanse groundwater. For example, one method for biotransforming and thereby cleansing groundwater containing TCE is to inject water containing simultaneously dissolved methane and oxygen into the contaminated aquifer to stimulate the growth of methanotrophic bacteria to a population size that will be effective in transforming TCE. Two technical problems have resulted when this is done. First, the bacteria tend to grow closer to the point of injection than at locations further distant from it. This can result in clogging of the aquifer near the point of injection of the chemical and uneven distribution of biological activity in the aquifer. Second, higher concentrations of the primary substrate, which usually occur where the bacterial activity is highest, may compete for the enzymes used in transformation of the secondary substrate, thus reducing the rate of secondary substrate transformation.

The present invention circumvents these problems by providing a method for purifying an underground water supply containing halogenated aliphatic compounds by in-situ biodegradation of said compounds.

It is one object of the present invention to provide a method for enhancing the in-situ degradation of halogenated aliphatic compounds in groundwater.

It is a further object of the present invention to provide enhanced in-situ degradation of halogenated aliphatic compounds and other organic contaminants by the use of microorganisms that have the capability to transform halogenated aliphatic compounds by promoting biostimulation of a class of indigenous microorganisms through the introduction of an appropriate primary substrate for growth (an electron donor) and an electron acceptor into the treatment zone.

It is a further object of the present invention to provide a method for the biotransformation of contaminants by injecting into an aquifer zone, water containing the electron donor and acceptor, respectively, in a manner where they are separated at the point of addition, thereby preventing biofouling of the area close to the point of injection and permitting a more even distribution of transforming organisms throughout the aquifer zone.

It is still another object of the present invention to provide a method for biotransformation of groundwater contaminants wherein the primary substrate, or electron donor, does not compete for the enzymes used by the microorganisms in biotransformation of the secondary substrate, i.e. the halogenated aliphatic compounds, thereby providing an improved rate of secondary substrate transformation.

Other objects and advantages of the present invention will become apparent as the description thereof proceeds.

SUMMARY OF THE INVENTION

The present invention is directed to a method for purifying an underground water supply containing halogenated aliphatic compounds by in-situ biodegradation of said compounds, comprising injecting water into an aquifer zone, the injected water containing an electron donor capable of being utilized by an indigenous population of microorganisms contained in the groundwater supply as a primary growth substrate, and an electron acceptor for oxidation of the primary substrate, by separate addition of electron donor and electron acceptor temporally or spatially to stimulate growth of the microorganisms and to distribute them throughout the aquifer zone to cause in-situ degradation of the halogenated aliphatic compounds by metabolic activity of the microorganisms.

The present invention is also directed to an apparatus for purifying an underground water supply containing halogenated aliphatic compounds by in-situ biodegradation of those compounds, comprising means for adding electron donor and electron acceptor into water prior to injection into an aquifer zone to stimulate growth of an indigenous population of microorganisms contained in the groundwater supply, and, means for injecting into an aquifer zone, the water containing the electron donor capable of being utilized by the indigenous population of microorganisms contained in the groundwater supply as a primary growth substrate, and an electron acceptor for oxidation of the primary substrate by separate addition, accomplished temporally or spatially, of the donor and acceptor to stimulate growth of the microorganisms and to distribute them throughout the aquifer zone.

One means of temporal separation is the addition of the electron donor and electron acceptor in alternating pulses. One means of spatial separation is the addition of electron donor and electron acceptor at different locations, such as at different wells.

By adding the electron donor and electron acceptor separately, either spatially or temporally, the present invention provides two major advantages over the prior art for biological transformation of contaminants. After separate injection, which can be accomplished by alternating pulses of donor and acceptor at one location, or separate addition at different locations into the aquifer zone, the water containing either the donor or acceptor moves through the aquifer and mixes slowly so that the donor and acceptor interact. This provides the microorganisms with the ability for improved oxidation of the electron donor, thus providing the microorganisms with improved growth characteristics. The pulsed cycles of donor and acceptor and the slow mixing that occurs in the aquifer, thereby discourage microorganism growth close to the point of injection and help to distribute the microorganisms more broadly throughout the aquifer.

Another possible advantage of the separate addition of donor and acceptor of the present invention is that a relatively low donor concentration prevails in the mixing zone in which the acceptor is present, with the result that the donor is less competitive with the enzymes used to transform the chemical contaminant used as the secondary substrate. Thus, the rate of secondary substrate transformation may be improved by the process of the present invention.

DESCRIPTION OF PREFERRED EMBODIMENTS

The present invention is a method designed to be employed in-situ. Therefore, a site based on available information regarding regional hydrology and geochemistry must be chosen. The site may be characterized by means of coring, pump tests, sampling, and analysis of the native groundwater. The hydraulic information obtained in pump tests and tracer experiments is required in order to design a fluid injection and extraction system that creates an in-situ reaction zone. The chemical, physical and microbiological characteristics of the test zone also indicate whether favorable conditions exist for the biostimulation of a native population of bacteria.

Figure 1:
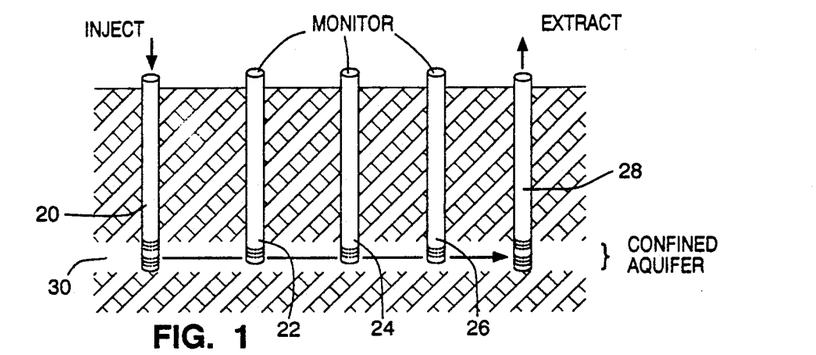
FIG. 1 schematically illustrates one possible model for the creation of the subsurface zone.

An aquifer zone in the subsurface may be created in a variety of ways. For example, FIG. 1 shows one possible model for the creation of a subsurface aquifer zone.

A series of injection, extraction and monitoring wells 20, 22–26 and 28, respectively, are installed within an aquifer 30, which may or may not be confined. An induced flow field is created by the injection and extraction of fluid. The chemicals of interest for a specific field location are metered into an injection stream. The concentrations of the specific chemicals are then monitored at several different locations including the injected fluid, the monitoring wells and the extracted fluid. The spatial and temporal response of the chemicals in the test zone may be determined by frequent monitoring using an automated data acquisition and control system located at the site. The experimental test site should be located in a region where the groundwater is contaminated with several organic solutes for which the biorestoration method of the present invention ma be applied.

In order for the site to have favorable hydraulic features for biodegradation it should have high transmissivity to permit the required pumping and injection of fluids into the aquifer zone. Loss of permeability by clogging due to biological growth or chemical precipitation may be reduced by having an original high permeability.

Core samples of aquifer solid material can be obtained to characterize the material's microbiological properties. Aseptic procedures as outlined by Wilson et al., "Enumeration and Characterization of Bacteria Indigenous to a Shallow Water Table Aquifer", *Groundwater*, 21(2):134–141 (1983), can be used to obtain the core samples and to transfer the materials to storage containers. The acridene orange-epifluorescence procedure of Ghiorse, W. C., et al., "Enumeration and Morphological Characterization of Bacteria Indigenous to Subsurface Environments", *Developments in Industrial Microbiology*, 24:213–224 (1983) can be used to enumerate the active bacteria attached to solid samples from the aquifer zone. The presence of methane consuming bacteria (methanotrophs) on aquifer solids may be demonstrated in columns packed with core solids according to the method of Wilson, et al., "Biological Treatment of Trichloroethylene In Situ", In Proceedings: Symposium on Groundwater Contamination, ASCE National Convention, Atlantic City, NJ, Apr. 27–30, 1987. This procedure may serve as an indicator of whether the aquifer zone has an indigenous microbial population that can be successfully biostimulated.

The distance between the injection well and extraction well should be a distance that will result in roughly equivalent fluid residence times between monitoring wells if radial flow conditions exist. Thus for example, in FIG. 2 a vertical section of a typical aquifer zone and well field is shown as used to demonstrate the present invention.

Figure 2:
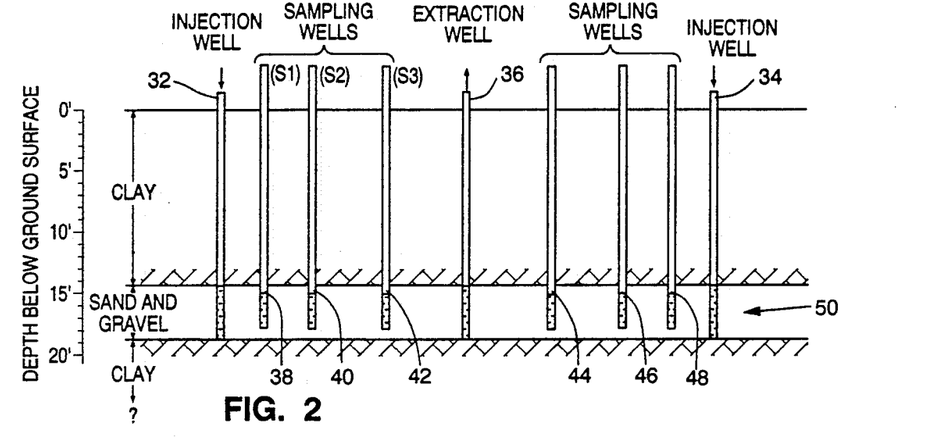
FIG. 2 schematically illustrates a vertical section of a typical zone as used in the present invention.

The well field may be designed to permit simultaneous experiments by creating two aquifer zones through the injection of fluids at both the south and north injection wells 32 and 34, and extraction at the central extraction well 36. Operation of the extraction well is intended to dominate the regional flow field in the area of interest in an approximation of radial flow.

In one example, the injection wells were located 6 meters from the extraction well. The monitoring or sampling wells 38–42 and 44–48 were located 1.0, 2.2 and 4.0 meters respectively from the injection wells. This spacing resulted in roughly equivalent fluid residence times between monitoring wells if radial flow conditions existed. The extraction and injection wells were constructed of two inch PVC wellstock which is slotted over a five foot screened section. The screened section was positioned fourteen feet to nineteen feet below the surface in order to fully penetrate the aquifer 50. The borehole around the screened section was back filled with sand. The monitoring or sampling wells 38–42 and 44–48 were constructed of 1.75 inch O.D. stainless steel well casing with a two foot screen drive point. The wells were installed with minimal disturbance of the aquifer 50 by augering to within one foot of the aquifer top and hand-driving the well point into the middle of the aquifer. The two foot screened section was placed to intercept what was considered to be the most permeable zone consisting of sands and gravels.

Figure 3:
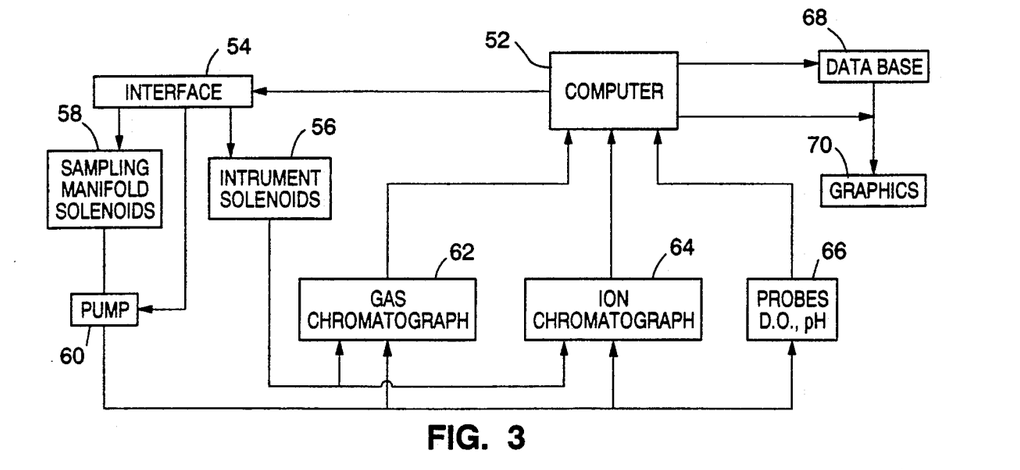
FIG. 3 is a block diagram of an automated data acquisition and control system that may be used in the present invention.

An automated data acquisition system may be used at the site to permit the continuous measurement of the principal parameters necessary for operation of the present invention—e.g. the concentrations of (1) elemental tracers used as controls such as bromide ion, (2) methane or other electron donor, (3) halogenated aliphatic compound of interest, (4) dissolved oxygen or other electron acceptor, and (5) pH. FIG. 3 schematically illustrates an automated data acquisition and control system which may be used in the present invention.

The system shown in FIG. 3 is driven by a microcomputer 52. The data acquisition and control program (DAC) may be designed so that it can be operated in either manual or automated mode. Manual mode permits selection of samples, creation of a sample sequence for automated operation, calibration of various instruments and graphing the results as the sampling proceeds. The computer 52 has interfacing means 54 to interface with both instrument solenoids 56 and sampling manifold solenoids 58. During automated operation the DAC selects the sample to be analyzed, opens the proper solenoid 56 or 58 and activates a peristaltic sampling pump 60. After withdrawing approximately 1.2 liters of sample, pumping may be stopped and samples analyzed by means of the gas and/or ion chromatographs 62 and 64, respectively and the probes 66 which monitor dissolved oxygen and PH. After completion of the data acquisition cycle, the DAC integrates the chromatographs 62 and 64, calculates and stores the results utilizing the data base 68 and can display those results by graphics 70.

The method of the present invention for purifying an underground water supply containing halogenated aliphatic compounds by in-situ biodegration of those compounds, comprises injecting water into an aquifer zone, the water containing an electron donor capable of being utilized by an indigenous population of microorganisms contained in the groundwater supply as a primary growth substrate, and an electron acceptor for oxidation of the primary substrate, by separate addition of donor and acceptor, temporally or spatially, to stimulate growth of the microorganisms and to distribute them throughout the aquifer zone to cause in-situ degradation of the halogenated aliphatic compounds by metabolic activity of the microorganisms.

The electron donor and electron acceptor may be separately added into the groundwater supply for example, by dissolving each separate pools of water, and then injecting the individual pools in alternating pulses of donor and acceptor into the aquifer zone.

The biostimulation in the aquifer zone may be accomplished by injecting water through wells peripheral to the underground water supply. The water could contain methane as an electron donor and primary growth substrate for utilization by the indigenous population of microorganisms, and oxygen as an electron acceptor. Methane and oxygen can be separately added to aliquots of water. The water aliquots containing the methane and oxygen, respectively, are then injected separately into the aquifer zone in alternating pulsed cycles to stimulate growth of the microorganisms and to distribute then throughout the zone. This method may also be applied to biostimulation of the vadose zone (unsaturated zone) in the subsurface.

Alternatively, biostimulation may be accomplished in the vadose zone by pulsing methane into the air and then introducing it into the vadose zone to stimulate a distributed growth of bacteria. Similar biostimulations could occur in the upper soils where separate pulsing of electron donor and acceptor, either in air or water could be applied. This could help distribute the bacteria deeper into the soil where chemical contaminants are present.

The method of the present invention employs microorganisms which comprise bacteria that are capable of utilizing the electron donor as a primary growth substrate and a separate electron acceptor for oxidation of the primary substrate. For example, the microorganisms used in the method of the present invention can comprise methanotrophic bacteria. The method of the present invention can employ a suitable electron donor which is selected from the group consisting of methane, ethane, propane, ethylene, catechol, and phenol. The electron acceptor of the present invention can be selected from the group consisting of oxygen, hydrogen peroxide, nitrates, sulfates and organics.

The present invention be used to purify an underground water supply containing halogenated aliphatic compounds selected from the group consisting of trichloroethylene, tetrachloroethylene, cis-1,2-dichloroethylene, trans-1,2-dichloroethylene, 1,2-dichloroethane, vinyl chloride, chloroform, 1,1,1-trichloroethane, 1,1,2-trichloroethane, 1,1-dichloroethylene, 1,1-dichloroethane, methylene chloride, methyl chloride, 1,2-dibromo-3-chloropropane, and 1,2-dibromoethane.

In one embodiment, the electron donor of the present invention comprises methane and the electron acceptor comprises oxygen. The halogenated aliphatic compound comprises trichloroethylene.

In this embodiment, the concentration of methane is maintained in the aquifer zone at from about 0.5 milligrams per liter water to about 40 milligrams per liter water. The concentration of the oxygen is maintained at from about 2 milligrams per liter water to about 100 milligrams per liter water. The methane and oxygen are alternately pulsed into the aquifer zone at about a weight ratio of 2:1 to 6:1, oxygen to methane. In one embodiment, the length of each of the pulsed cycles of methane and oxygen are from about 2 to 48 hours in duration.

Figure 4:
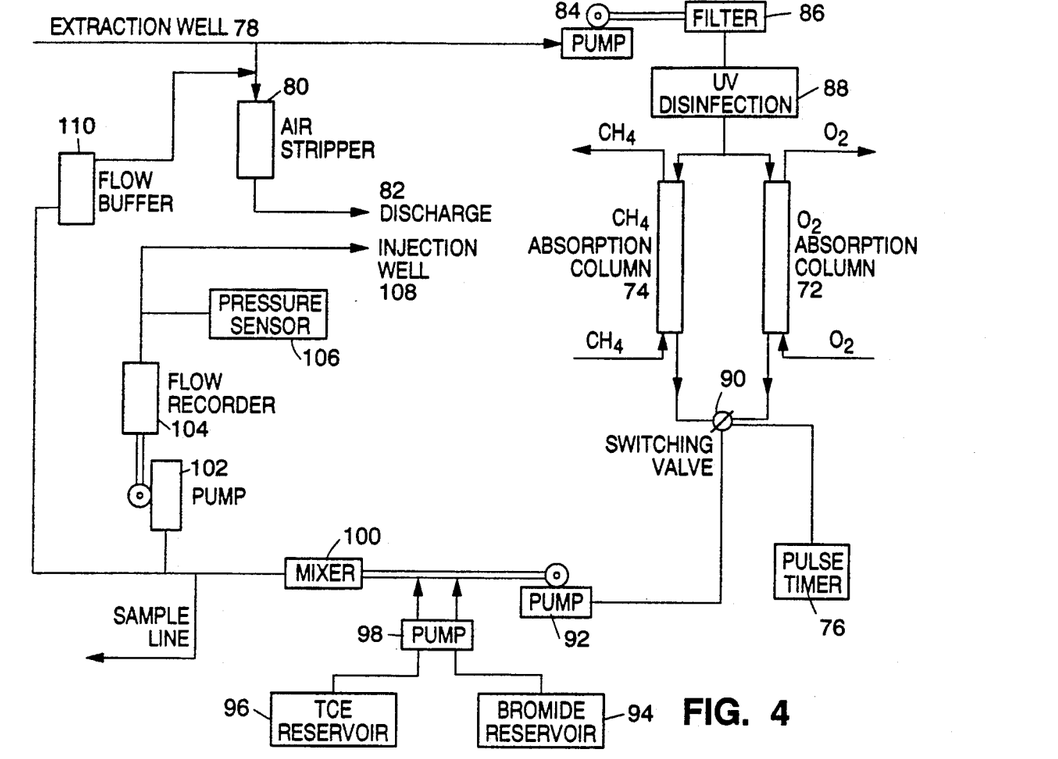
FIG. 4 is a schematic diagram of one injection system that may be used in the biostimulation and biotransformation experiments.

FIG. 4 shows one injection system that may be used in biostimulation and biotransformation.

The system uses two counter current columns 72 and 74 to sorb the electron donor and acceptor. A pulsed timer 76 permits the ratio and length of the pulses to be varied. The injection system is connected to the extraction well 78. The air stripper 80 removes air from the sample and is discharged at point 82. The groundwater is pumped by pump 84 through filter 86, UV disinfected by disinfector unit 88 and then run through columns 72 and 74. The effluent from the columns can be controlled by means of a switching valve 90 and the separate pulses flow through the system by means of pump 92. The other components of the injection system permit the accurate and continuous addition of tracer into the injection stream, the monitoring of the injection rates and a sampling of the injection fluid while maintaining a constant rate of injection. In this injection system, the contaminant was also added from reservoir 96, in in-situ remediation. This would not be necessary since the contaminant would already be present in the aquifer. There were separate reservoirs 94 and 96 for addition of tracer used as a control, and the contaminant to be purified, respectively. The contents of these reservoirs are moved through the system by pump 98 and mixer 100 mixes the contaminants with the methane and oxygen pulses and includes flow buffer 110. The mixture is then pumped by pump 102 through a flow recorder 104 and pressure sensor 106 to monitor the injection rates of tracer and contaminant. The system is also connected to injection well 108.

To enhance effectiveness of biostimulation, the electron donor and electron acceptor are introduced into the aquifer zone in alternating pulsed cycles. This avoids clogging of the injection well and borehole interface and achieves a more uniform distribution of said organisms throughout said aquifer zone.

Clogging of the injection well would cause loss of hydraulic capacity and premature termination of the purification process as drastic chemical measures such as chlorination or strong acid treatment which are customarily employed to rejuvenate clogged wells, would interfere with biostimulation. Failure to achieve a uniform distribution of microorganisms throughout the aquifer would lead to conditions of extremely high microbial densities near the injection point and low bacterial populations elsewhere which would interfere with secondary substrate utilization as needed to degrade the halogenated aliphatic compounds by microorganisms, such as methanotrophs.

Introducing the two essential additives, electron donor and acceptor, in alternating pulsed cycles assures their separation in the injection well and borehole, thus discouraging biological growth in that critical region. The donor and acceptor then mix gradually by the action of hydrodynamic dispersion and associated mixing properties during transport through the aquifer, stimulating the growth of organisms such as methanotrophic bacteria over the zone in which mixing occurs.

In designing the pulsed injection system, two variables must be selected: (1) the ratio of the individual pulses of donor and acceptor, and (2) the overall pulse length.

The ratio of the individual pulses of donor and acceptor can be estimated approximately from knowledge of their stoichiometry. For example, if methane and oxygen are the donor and acceptor, respectively, the oxygen requirement for complete oxidation of methane is 2 moles oxygen per mole methane, corresponding to a mass ratio of 4 grams $O_2$ per gram methane. Because some electron donor is used for cell growth, the actual mass ratio is somewhat less, or about 3 grams $O_2$ per gram methane. In choosing the pulse lengths, the concentrations achieved by the saturation columns for oxygen and methane would also have to be taken into account.

The overall pulse length may be evaluated by employing a transport model that incorporates a periodic input such as that described by Valocchi, A. J. and Roberts, P. V. "Attenuation of Ground Water Contaminant Pulses", *Journal Hydrological Engineering* (ASCE), 109(12):1665-1682 (1983). The length of each of the pulsed cycles of electron donor and acceptor comprise a periodic input corresponding most closely to alternating inputs of the donor and acceptor. For example, the form of periodic input which corresponds most closely to alternating inputs of methane and oxygen is the rectangular pulse or saw-toothed wave. The model of Valocchi and Roberts takes into account the effects of advection, dispersion and sorption on transport and mixing of rectangular pulses under conditions of uniform flow.

In the absence of reaction, the preferred length of each of the pulsed cycles of donor and acceptor comprise a normallized amplitude ratio of about 1. Such a ratio provides a convenient measure of the degree to which the pulses remain separated during transport or conversely the degree to which mixing has occurred. In the present invention, the amplitude ratio is the ratio of observed magnitude of concentration fluctuations of the donor and acceptor measured at a monitoring well a distance X removed from the injection point to the magnitude of the fluctuations of the donor and acceptor measured at the injection point. The amplitude ratio varies from zero to unity. Thus a value near unity means concentration fluctuations are damped nearly completely and signifies virtually complete mixing over the distance traversed. A value near zero implies negligible mixing.

EXAMPLE 1

Tracer Experiment

A tracer experiment was performed prior to biostimulation and biodegradation, to make comparisons and serve as a pseudo-control before and after transformation had occurred. Fluid was injected into well 32 and extracted at well 36 (See FIG. 2.) This configuration resulted in an induced gradient which is superimposed on the natural gradient, thus creating conditions for the effective capture of the injected fluid at the extraction well 36.

Groundwater was extracted at a rate of 8 liters per minute and reinjected at a constant rate of 0.6 liter per minute. The groundwater was air stripped prior to reinjection to remove background concentrations of organics and to oxygenate the groundwater to a dissolved oxygen concentration of 8 milligrams per liter. Bromide and TCE were added to the air stripped groundwater to achieve the desired concentration and injected at a constant rate. The injection of bromide tracer was performed as a broad pulse. Bromide was added at an average concentration of 230 milligrams per liter for 250 hours. TCE was injected concurrently with bromide at an average concentration of 160 micrograms per liter for 350 hours. The tracer breakthroughs as well as their elution from the test zone were continuously measured at the monitoring wells 38 (S1), 40 (S2), 42 (S3) and the extraction well 36.

Figure 5:
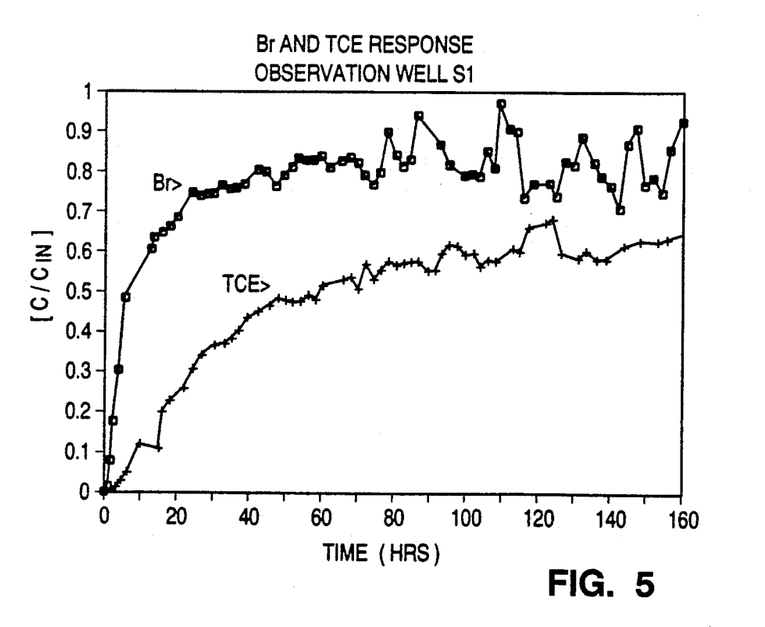
FIG. 5 graphically shows the normalized response of bromide and TCE at the S1 monitoring well in the bromide tracer experiment of Example 1.

FIG. 5 shows the response of both bromide and TCE at S1 monitoring well 32 during the early stages of the tracer experiment.

Figure 6:
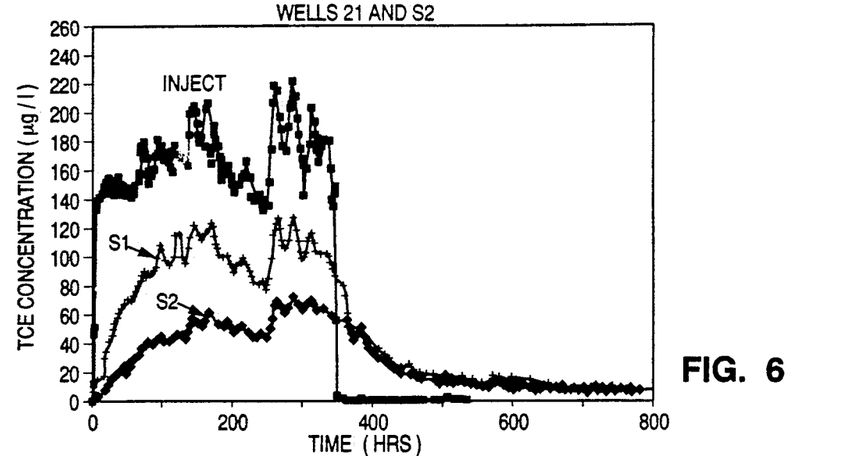
FIG. 6 graphically shows the TCE responses at monitoring locations after addition of TCE was stopped in the bromide tracer experiment of Example 1.

The movement of TCE is shown to be retarded with respect to bromide with a more gradual approach to the injected concentration. FIG. 6 shows the TCE responses at observation locations after the TCE addition was stopped.

Mass balances based on the tracer experiment results indicated that 61% of the injected bromide was recovered by the extraction well whereas 55% of the TCE was recovered over the 800 hour period during which continuous observations were made. The recovery of the TCE was similar to that obtained for bromide indicating that the loss of TCE results primarily from the flow conditions and not degradation. Thus, the tracer experiment serves as a control to which the biotransformation studies can be compared.

The tracer experiment indicated recovery of 60-75% of the bromide injected. TCE was recovered to the same degree as bromide indicating negligible loss of TCE.

EXAMPLE 2

Biostimulation of TCE Using Methane as Electron Donor and Oxygen as Electron Acceptor The schematic of the injection system (FIG. 4) used in biostimulation using methane and oxygen employed two counter current columns 72 and 74 to sorb the methane and oxygen to approximately 80% saturation. This resulted in concentrations that were approximately 20 milligrams per liter for methane and 32 milligrams per liter for dissolved oxygen. The solutions were alternately pulsed at about a volume ratio of 2 to 1, methane to oxygen, based on the stoichiometric requirements. A pulse timer 76 permitted the ratio and length of the pulses to be varied.

The pulsed cycle for injection of either methane or oxygen containing groundwater was varied during the course of the experiment from less than one hour during start-up, to ensure the pulsing would not interfere with microorganism growth, to a 12-hour period during the later stages to distribute growth in the test zone.

Figure 7:
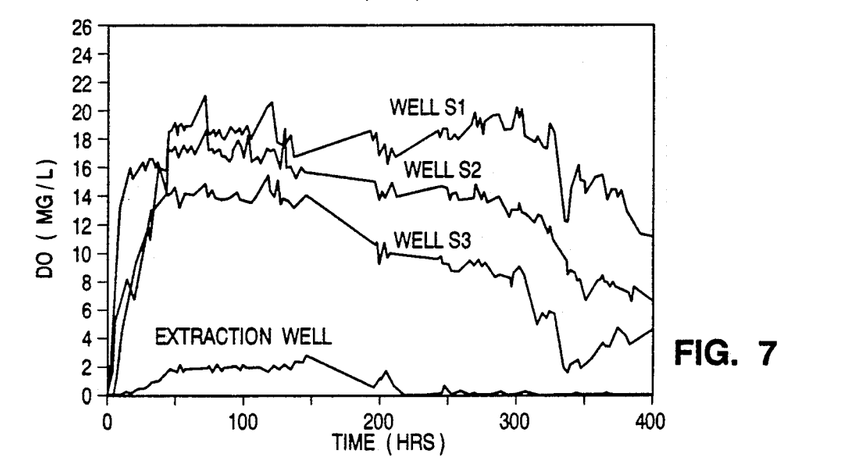
FIG. 7 graphically shows the dissolved oxygen concentration as a function of time at the three monitoring wells S1, S2 and S3 and the extraction well in the biostimulation experiment of Example 2.

FIG. 7 shows the dissolved oxygen concentration as a function of time at the three monitoring wells 38 (S1), 40 (S2) and 42 (S3) and the extraction well 36.

The consumption of oxygen increased with time indicating the stimulation of a microbial population. During initial stages of the experiment there was little evidence of oxygen consumption. At 0 to 50 hours the maximum dissolved oxygen concentrations were 19, 17 and 14 milligrams per liter at wells 38 (S1), 40 (S2) and 42 (S3), respectively, which resulted from the combined effects of the pulsed injection of the dissolved oxygen water and dilution by the native groundwater. The first signs of consumption were observed in the extraction well 36 and the S3 observation well 42 after approximately 200 hours of injection. The concentration at the extraction well decreased below the detection limit after 300 hours of injection. Because of the continuous removal by microorganisms of dissolved oxygen, the decrease in dissolved oxygen was greater the longer the travel paths through the aquifer. As time proceeded, the increase in the growth of microorganisms throughout the test zone resulted in an increase in the dissolved oxygen consumption along the flow path.

Figure 8:
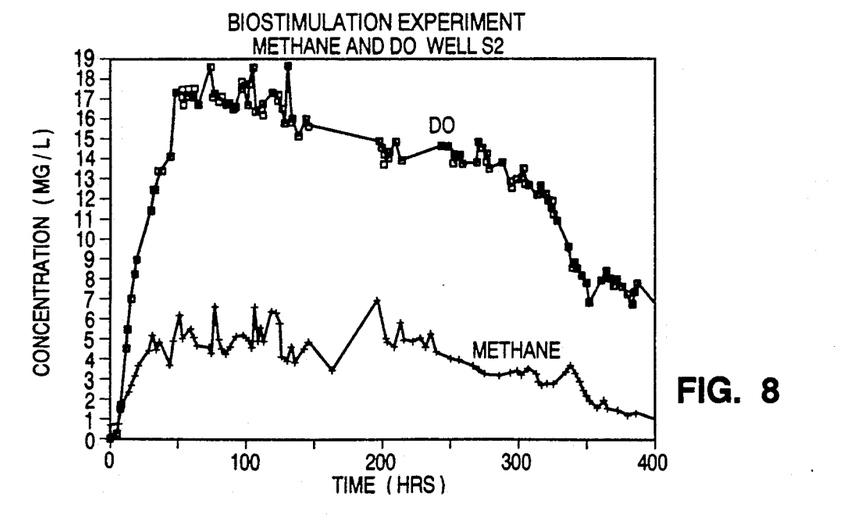
FIG. 8 graphically shows the response of methane and dissolved oxygen at the S2 monitoring well during biostimulation of the test zone.

FIG. 8 shows the response of methane and dissolved oxygen at the S2 monitoring well 40 during biostimulation of the test zone.

The methane response was similar to that observed for the dissolved oxygen which was expected since methane was the electron donor and oxygen was the electron acceptor for the microorganism growth. The fairly rapid increase in methane concentration over the period from 200 to 400 hours indicates fairly rapid growth kinetics typical of aerobic microorganisms. A significant amount of methane substrate was incorporated into cells. Based on the concentration values during the period of 350 to 375 hours, the ratio of oxygen to methane consumed was 2.25 milligrams oxygen per milligram methane, which is significantly lower than the ratio of 4 required for complete oxidation. The lower value suggests incorporation of methane substrate into the cell mass.

Figure 9:
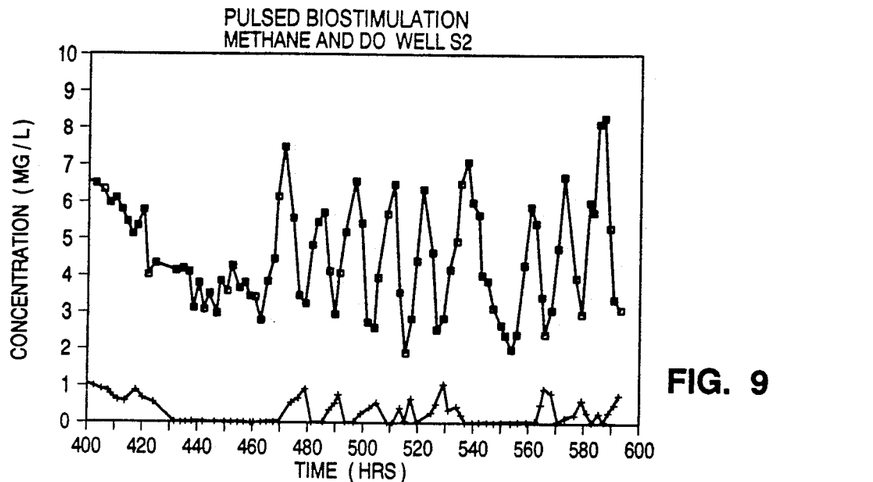
FIG. 9 graphically shows the effective long term pulsing of dissolved oxygen and methane on the respone at the S2 monitoring well.

After 450 hours of injection, the methane concentration at the S2 monitoring well 40 decreased below the detection limit indicating that the microbial mass was increasing near the injection well. The pulsed cycles were therefore lengthened to 12 hours in order to prevent biofouling near the well bore. FIG. 9 shows the response of the system to the pulsing at the S2 monitoring well 40.

Peak methane values are shown to increase from below detection to approximately 1 milligram per liter water as a result of the longer pulse duration.

Long pulse cycles were continued throughout the biostimulation and biodegradation experiments with durations ranging from 6 to 12 hours. Based on continued methane breakthrough at the monitoring wells 38-42 and 44-48, it is indicated that the pulsing helped distribute the microbial population in the aquifer zone and prevented biofouling of the aquifer.

The experiments of EXAMPLE 2 demonstrate that methaneoxidizing bacteria can be successfully established in the aquifer zone. The transient methane and dissolved oxygen responses indicated that a population was stimulated which grew closer to the injection well with time. The response indicates that the microorganisms have fairly rapid growth kinetics typical of aerobic organisms. Thus, pulsing was required to distribute the growth in the aquifer zone and to prevent aquifer biofouling.

EXAMPLE 3

Biotransformation

Biotransformation experiments were performed after the zone was biostimulated. TCE was continuously injected over a three month period into the zone. During the initial stages, TCE was injected at an average concentration of 100 µg/l. During later stages the concentration was lowered to 60 µg/l. Methane and oxygen were continuously pulse-injected during this period to support the methane oxidizing microorganisms which had been biostimulated.

Figure 10:
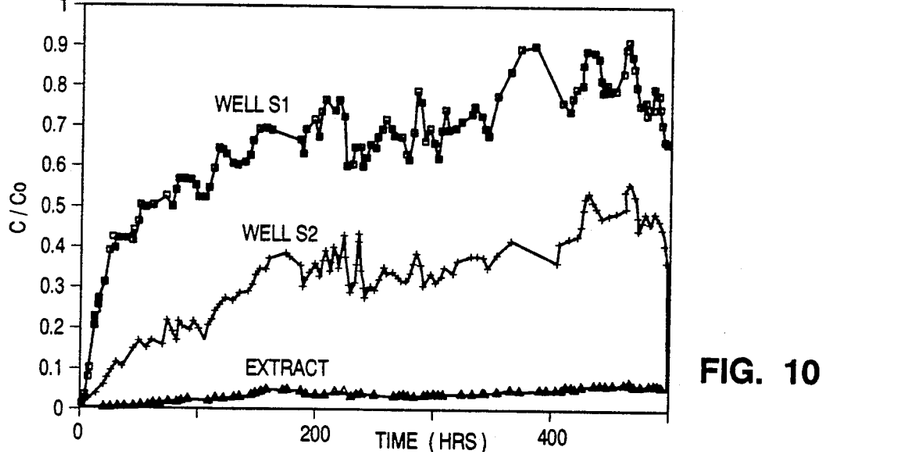
FIG. 10 graphically shows the normalized breakthrough of TCE at observation locations during the initial stage of the biotransformation experiment.

During the initial phase of the experiment the TCE concentration slowly approached steady-state values. FIG. 10 shows the normalized breakthrough of TCE at observation locations during the initial stage of the biotransformation experiments.

Fractional breakthroughs occurred of approximately 60% of the injection concentration after 100-150 hours of injection. The breakthrough response at the S1 well 38 was similar to that observed in the tracer experiment of EXAMPLE 1, shown in FIG. 5. This indicates that limited degradation of TCE was occurring in the biostimulated zone within 1 meter of the injection well. This is further supported by the long term steady-state values of 80% of the injected concentration that was obtained after 400 hours of injection.

The breakthrough at the S2 observation well 40 indicated that some degradation was occurring during the early stages of TCE addition. The early breakthrough results indicated that degradation may be as high as 30%.

Comparisons of mass balances of the amount injected and extracted in using bromide tracer and TCE suggested that some degree of degradation was occurring during early stages of biodegradation. In the bromide tracer experiment, 2.24 grams TCE were injected over a 338 hour period of which 0.9 grams were recovered during the same period representing a recovery of 39% at the extraction well. In the biotransformation experiment 2.09 grams TCE were injected over a 347 hour period of which 0.53 grams were recovered in the extracted water representing a recovery of 25%. The 11% lower recovery or 35% on a relative basis indicates that partial degradation of TCE occurred.

Figure 11:
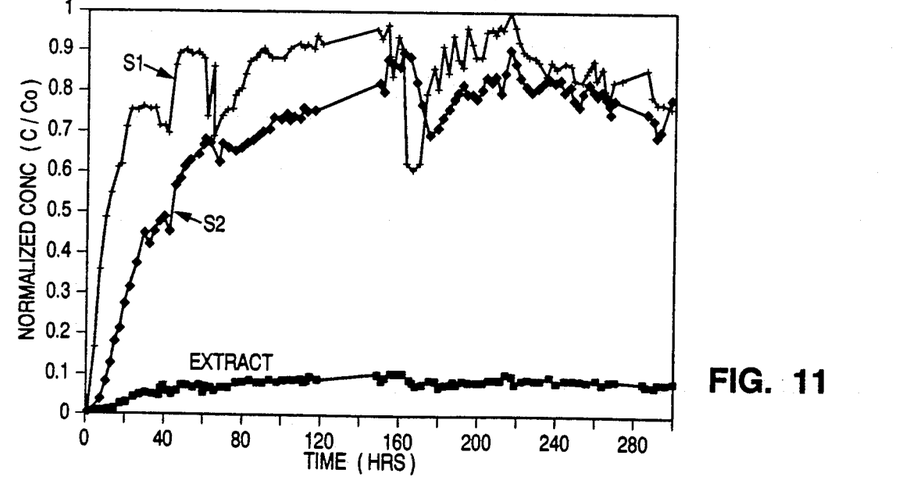
FIG. 11 graphically shows bromide tracer results during a period when TCE concentrations were at steady state value in the biotransformation experiment.
Figure 12:
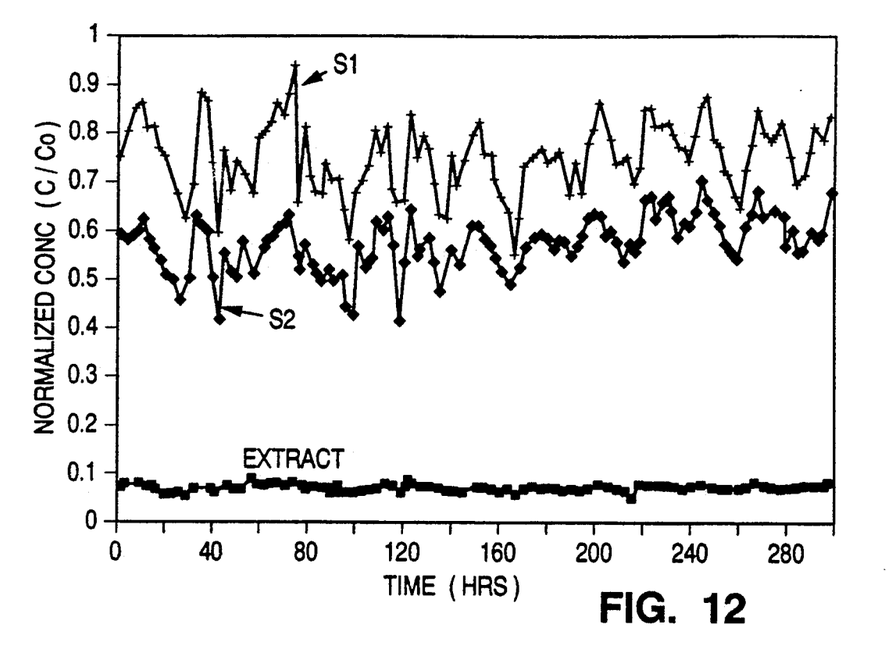
FIG. 12 graphically shows steady state TCE concentrations corresponding to the same time period as the bromide data in FIG. 11 during biotransformation experiments.

Toward the end of the biotransformation experiment, the TCE injection concentration was lowered from 100 to 60 µg/l to ensure that no sorptive uptake of TCE by aquifer solids would occur and that maximum steady-state concentrations were being achieved. This permitted an estimation of degree of degradation based on steady-state concentrations of TCE compared to bromide, the non-reactive, conservative tracer. FIG. 11 shows bromide tracer results during a period when TCE concentrations were at steady-state. FIG. 12 shows steady-state TCE concentrations corresponding to the same time period as the bromide data in FIG. 11.

The fractional breakthroughs of bromide are shown to be significantly higher than those obtained by TCE. This comparison indicates that the lower normalized concentration of TCE results from degradation.

Figure 13:
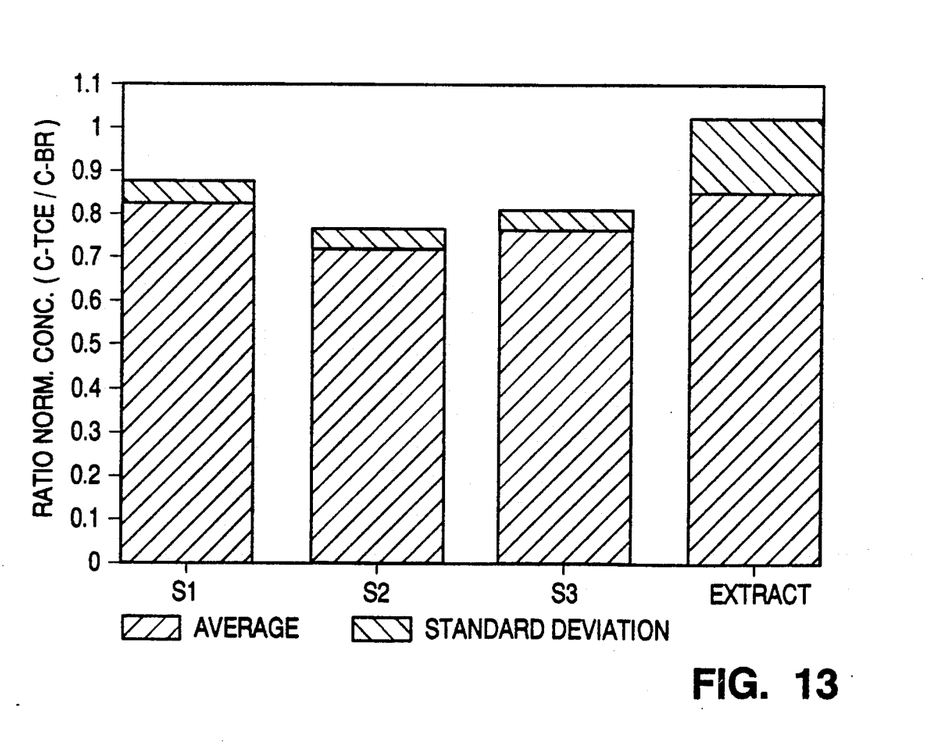
FIG. 13 graphically shows estimated TCE biotransformation based on comparisons with bromide as a tracer.

FIG. 13 represents a summary of these experiments, where the fractional breakthroughs of TCE relative to bromide ion (TCE/Br) at the monitoring wells are compared.

The ratios range from 70% to 80% indicating a maximum degree of degradation of 30%. Degradation occurred in the area of the aquifer zone in which methane was present to support the methane-oxidizing bacteria. In the area between wells S2 and S3, 40 and 42, and the extraction well 36, no methane was present to support the bacteria and accordingly no additional degradation of TCE was observed.

The different methods of assessing degree of degradation include mass balance techniques, comparison of TCE breakthrough concentrations with a control experiment, and comparisons with bromide concentrations at steady-state within an experiment. These methods yielded similar estimates of the degree of TCE degradation in the test zone. The degree of degradation was in the range of 20-30%.

The invention has been described herein with reference to certain preferred embodiments. However, as obvious variations thereon will become apparent to those skilled in the art, the invention is not to be considered as limited thereto.

What is claimed is:

1. A method for purifying an underground water supply containing halogenated aliphatic compounds by in-situ biodegradation of said compounds, comprising:
   injecting at least two water aliquots into an aquifer zone, at least one of said aliquots containing an electron donor capable of being utilized by an indigenous population of microorganisms contained in said groundwater supply as a primary growth substrate, and at least one of said aliquots containing an electron acceptor for oxidation of said primary growth substrate, wherein each of said aliquots are injected in said aquifer zone at separate points of addition into said aquifer zone, to stimulate growth of said microorganisms and to distribute them throughout said aquifer zone to cause in-situ degradation of said halogenated aliphatic compounds by metabolic activity of said microorganisms.

2. The method of claim 1 wherein said microorganisms comprise bacteria which are capable of utilizing,
  (a) said electron donor as a primary growth substrate; and
  (b) said electron acceptor for oxidation of said primary substrate.

3. The method of claim 1 wherein said microorganisms comprise methanotrophic bacteria.

4. The method of claim 1 wherein said electron donor is selected from the group consisting of methane, ethane, propane, ethylene, catechol and phenol.

5. The method of claim 1 wherein said electron acceptor is selected from the group consisting of oxygen, hydrogen peroxide, nitrates, sulfates and organics.

6. The method of claim 1 wherein said separate addition of electron donor and electron acceptor into said groundwater supply is accomplished by injecting alternating pulsed cycles of donor and acceptor into said groundwater.

7. The method of claim 6 wherein the length of each of said pulses of electron donor and acceptor comprise a periodic input corresponding to alternating inputs of said donor and acceptor.

8. The method of claim 6 wherein the length of each of said pulses comprises a normalized amplitude ratio of about 1.

9. The method of claim 8 wherein said amplitude ratio is the ratio of observed magnitude fluctuation measured at an observation of a given distance from the injection point of said electron donor and acceptor into said zone, to the magnitude of fluctuation at the injection point.

10. The method of claim 1 wherein said electron donor comprises methane and said electron acceptor comprises oxygen.

11. The method of claim 10 wherein the concentration of said methane is maintained in said aquifer zone at from about 0.5 mg/l water to about 40 mg/l water.

12. The method of claim 10 wherein the concentration of said oxygen is maintained at from about 2 mg/l water to about 100 mg/l water.

13. The method of claim 10 wherein said methane and oxygen are alternately pulsed into said aquifer zone at a weight ratio of about 2:1 to 6:1 oxygen to methane.

14. The method of claim 13 wherein the length of each of said pulses of methane and oxygen is from about two to forty-eight hours in duration.

15. The method of claim 1 wherein said groundwater contains one or more of the halogenated aliphatic compounds selected from the group consisting of trichloroethylene, tetrachloroethylene, cis-1,2-dichloroethylene, trans-1,2-dichloroethylene, 1,2-dichloroethane, vinyl chloride, chloroform, 1,1,1-trichloroethane, 1,1,2-trichloroethane, 1,1-dichloroethylene, 1,1-dichloroethane, methylene chloride, methyl chloride, 1,2-dibromo-3-chloropropane and 1,2-dibromoethane.

16. A method for purifying an underground water supply containing halogenated aliphatic compounds by in-situ biodegradation of said compounds, comprising:
  (a) addition of an electron donor into at least one aliquot of water, said electron donor being capable of being utilized by an indigenous population of microorganisms contained in said groundwater supply as a primary growth substrate, and addition of an electron acceptor into at least a second aliquot of water for oxidation of said primary substrate; and
  (b) injecting into an aquifer zone, in alternating pulsed cycles each of said aliquots containing said donor and said acceptor to stimulate growth of said microorganisms and to distribute them throughout said zone to cause in-situ degradation of said halogenated aliphatic compounds by the metabolic activity of said microorganisms.

17. The method of claim 16 wherein said microorganisms comprise bacteria which are capable of utilizing,
  (a) said electron donor as a primary growth substrate; and
  (b) said electron acceptor for oxidation of said primary substrate.

18. The method of claim 16 wherein said microorganisms comprise methanotrophic bacteria.

19. The method of claim 16 wherein said electron donor is selected from the group consisting of methane, ethane, propane, ethylene, catechol and phenol.

20. The method of claim 16 wherein said electron acceptor is selected from the group consisting of oxygen, hydrogen peroxide, nitrates, sulfates and organics.

21. The method of claim 16 wherein the length of each of said pulses of electron donor and acceptor comprise a periodic input corresponding to alternating inputs of said donor, and acceptor.

22. The method of claim 16 wherein the length of each of said pulses comprises a normalized amplitude ratio of about 1.

23. The method of claim 22 wherein said amplitude ratio is the ratio of observed magnitude fluctuation measured at an observation of a given distance from the injection point of said electron donor and acceptor into said zone, to the magnitude of fluctuation at the injection point.

24. The method of claim 16 wherein said electron donor comprises methane and said electron acceptor comprises oxygen.

25. The method of claim 24 wherein the concentration of said methane is maintained in said aquifer zone at from about 0.5 mg/l water to about 40 mg/l water.

26. The method of claim 24 wherein the concentration of said oxygen is maintained at from about 2 mg/l water to about 100 mg/l water.

27. The method of claim 24 wherein said methane and oxygen are alternately pulsed into said aquifer zone at a weight ratio of about 2:1 to 6:1 oxygen to methane.

28. The method of claim 27 wherein the length of each of said pulses of methane and oxygen are from about two to forty-eight hours in duration.

29. The method of claim 16 wherein said groundwater contains one or more of the halogenated aliphatic compounds selected from the group consisting of trichloroethylene, tetrachloroethylene, cis-1,2-dichloroethylene, trans-1,2-dichloroethylene, 1,2-dichloroethane, vinyl chloride, chloroform, 1,1,1-trichloroethane, 1,1,2-trichloroethane, 1,1-dichloroethylene, 1,1-dichloroethane, methylene chloride, methyl chloride, 1,2-dibromo-3-chloropropane and 1,2-dibromoethane.

* * * * *

UNITED STATES PATENT AND TRADEMARK OFFICE
CERTIFICATE OF CORRECTION

PATENT NO. : 5,006,250
DATED : April 9, 1991
INVENTOR(S) : Paul V. Roberts et al.

It is certified that error appears in the above-identified that said Letters Patent is hereby corrected as shown below:

Column 1, line 5, insert the following:

--This invention was made with Government support under contract CR 812220-02 awarded by the EPA. The Government has certain rights in this invention.--

Signed and Sealed this

Twenty-first Day of February, 1995

Attest:

BRUCE LEHMAN

Attesting Officer

Commissioner of Patents and Trademarks